United States Patent
Morie et al.

(10) Patent No.: US 10,389,440 B2
(45) Date of Patent: Aug. 20, 2019

(54) COHERENT OPTICAL RECEIVER DEVICE AND COHERENT OPTICAL RECEIVING METHOD

(71) Applicant: NEC CORPORATION, Tokyo (JP)

(72) Inventors: Masao Morie, Tokyo (JP); Kouichi Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 117 days.

(21) Appl. No.: 15/010,979

(22) Filed: Jan. 29, 2016

(65) Prior Publication Data

US 2016/0164602 A1    Jun. 9, 2016

Related U.S. Application Data

(63) Continuation of application No. 13/980,307, filed as application No. PCT/JP2012/051731 on Jan. 20, 2012, now Pat. No. 9,252,888.

(30) Foreign Application Priority Data

Jan. 20, 2011 (JP) ................................. 2011-009701

(51) Int. Cl.
   *H04B 10/079* (2013.01)
   *H04B 10/61* (2013.01)

(52) U.S. Cl.
   CPC ..... *H04B 10/07955* (2013.01); *H04B 10/611* (2013.01); *H04B 10/616* (2013.01); *H04B 10/6166* (2013.01)

(58) Field of Classification Search
   USPC .......................................................... 398/38
   See application file for complete search history.

(56) References Cited

U.S. PATENT DOCUMENTS

| 8,391,725 B2 | 3/2013 | Oda et al. |
| 2004/0080753 A1* | 4/2004 | McAlexander ........... G01J 9/04 356/484 |

(Continued)

FOREIGN PATENT DOCUMENTS

| JP | S 64-39838 A | 2/1989 |
| JP | H 05-347603 A | 12/1993 |

(Continued)

OTHER PUBLICATIONS

Japanese Office Action dated Dec. 1, 2015 with a partial English translation.

(Continued)

*Primary Examiner* — Omar S Ismail
(74) *Attorney, Agent, or Firm* — McGinn I.P. Law Group, PLLC

(57) ABSTRACT

A coherent optical receiver device includes a first unit configured to output local oscillation light having a predetermined wavelength, a second unit configured to receive an optical signal to have been inputted by making the optical signal interfere with the local oscillation light, a third unit configured to process electrically the optical signal received by the second unit, a fourth unit configured to monitor at least a part of power of the optical signal, and a fifth unit configured to control power of the local oscillation light output by the first unit depending on an optical power monitored by the fourth unit.

14 Claims, 5 Drawing Sheets

(56) References Cited

U.S. PATENT DOCUMENTS

| | | | | |
|---|---|---|---|---|
| 2009/0047030 A1* | 2/2009 | Hoshida | ................. | H04B 10/60 |
| | | | | 398/205 |
| 2010/0111544 A1* | 5/2010 | Oda | ...................... | H04B 10/60 |
| | | | | 398/204 |
| 2010/0254718 A1 | 10/2010 | Oda et al. | | |
| 2010/0260504 A1* | 10/2010 | Takahara | ........... | H04B 10/5053 |
| | | | | 398/152 |
| 2010/0278528 A1* | 11/2010 | Isomura | ................. | H04B 10/61 |
| | | | | 398/25 |
| 2011/0182589 A1* | 7/2011 | Kotake | ................ | H04B 10/532 |
| | | | | 398/152 |
| 2012/0177368 A1* | 7/2012 | Aoki | .................... | H04B 10/616 |
| | | | | 398/38 |
| 2013/0071109 A1* | 3/2013 | Khatana | ............... | H04B 10/615 |
| | | | | 398/38 |

FOREIGN PATENT DOCUMENTS

| | | |
|---|---|---|
| JP | 2010-109847 A | 5/2010 |
| JP | 2010-245772 A | 10/2010 |

OTHER PUBLICATIONS

U.S. Notice of Allowance dated Mar. 27, 2015 in co-pending U.S. Appl. No. 13/980,307.
U.S. Office Action dated Nov. 3, 2014 in co-pending U.S. Appl. No. 13/980,307.
International Search Report dated Mar. 27, 2012 in PCT/JP2012/051731, with English translation thereof.

* cited by examiner

COHERENT OPTICAL RECEIVER DEVICE AND COHERENT OPTICAL RECEIVING METHOD

The present application is a Continuation Application of U.S. patent application Ser. No. 13/980,307, filed on Jul. 17, 2013, which is based on International Application No. PCT/JP2012/051731, filed on Jan. 20, 2012, which is based on Japanese Patent Application No. 2011-009701, filed on Jan. 20, 2011, the entire contents of which are incorporated herein by reference.

TECHNICAL FIELD

The present invention relates to coherent optical receiver devices and coherent optical receiving methods, in particular, to a coherent optical receiver device and a coherent optical receiving method providing high quality received signals.

BACKGROUND ART

It is required to further enlarge the capacity in a backbone transmission system as the amount of information (traffic) in the Internet increases. A coherent optical transmission technology has drawn attention as one of technologies for high capacity. In the coherent optical transmission technology, an AC (Alternating Current) signal component is received which is amplified by mixing signal light and local oscillation (LO) light in a coherent optical receiver device. At that time, the larger the optical output of the local oscillation (LO) light becomes, the larger amplifying operation acts on the signal light. Therefore, the receiving characteristics with the high S/N (Signal/Noise) ratio can be obtained by inputting the high-power local oscillation (LO) light compared with the signal light.

An example of such coherent optical receiver device is described in patent literature 1. The coherent optical receiver device described in patent literature 1 includes an optical hybrid, an optical receiver, an analog-to-digital converter (ADC), and a signal processing unit, and further includes a signal quality monitor, a controlling amount providing unit, an input light level controller, and a local light source.

The input light level controller controls the level of the light signal to be introduced into the optical hybrid, that is, the level of the light signal propagated through the optical transmission path, under the control of the controlling amount providing unit. The level of the local light to be output to the optical hybrid is controlled under the control of the controlling amount providing unit. The signal quality monitor monitors the quality of received signals with reference to information obtained through digital signal processing performed in the signal processing unit.

The controlling amount providing unit provides the input light level controller and the local light source with controlling amounts based on the monitoring results by the signal quality monitor, by which the controlling amount providing unit controls the power ratio between input light and local light that are to be introduced into the optical hybrid and be mixed with each other. In addition, the controlling amount providing unit controls the amplitude of signal light and local light keeping the power ratio constant.

By adopting the configuration, it becomes possible to keep the power ratio between the signal light power and the local light power to a constant level at least. On the other hand, when the local oscillation light power is kept constant, the signal quality of received signals becomes optimum with the signal light power in a prescribed range. As a result, according to the related coherent optical receiver device disclosed in patent literature 1, it is said that the signal quality of received signals can be kept high by controlling the power ratio between the signal light power and the local light power. In addition, it is said that the amplitudes of the signal light and the local light can also be optimized to contribute to further improvement in the quality of received signals.

Patent literature 1: Japanese Patent Application Laid-Open Publication No. 2010-245772 (paragraphs [0031] to [0071])

DISCLOSURE OF INVENTION

Problem to Be Solved by the Invention

The related coherent optical receiver device described above is configured to control the level of signal light and local light until a monitor value from the signal quality monitor fulfills a predetermined threshold condition. Therefore, there has been a problem that the control process for keeping received signals in high quality becomes complex.

The objective of the present invention is to provide a coherent optical receiver device and a coherent optical receiving method which solve the problem mentioned above that, in the related coherent optical receiver device, the control process for keeping received signals in high quality is complicated.

Means for Solving a Problem

A coherent optical receiver device according to an exemplary aspect of the invention includes a coherent optical receiver receiving input signal light; an input power monitor obtaining input power information determined on the basis of the power of the input signal light; a local oscillator connected to the coherent optical receiver; and a controller connected to the coherent optical receiver, the input power monitor, and the local oscillator; wherein the coherent optical receiver includes a 90-degree hybrid circuit, a photoelectric converter, and an amplifier; the input power monitor is disposed in the optical path of the input signal light in a stage preceding the amplifier; and the controller obtains the input power information from the input power monitor and controls the power of local oscillation light output from the local oscillator on the basis of the input power information.

A coherent optical receiving method according to an exemplary aspect of the invention includes the steps of: receiving input signal light; obtaining input power information determined on the basis of the power of the input signal light; making the input signal light interfere with local oscillation light, detecting the input signal light, and outputting a signal after detection; and controlling the power of the local oscillation light on the basis of the input power information.

Effect of the Invention

According to the coherent optical receiver device and the coherent optical receiving method of the present invention, it becomes possible to keep received signals in high quality in a simple configuration.

DESCRIPTION OF EMBODIMENTS

The exemplary embodiments of the present invention will be described with reference to drawings below.

The First Exemplary Embodiment

Figure 1:
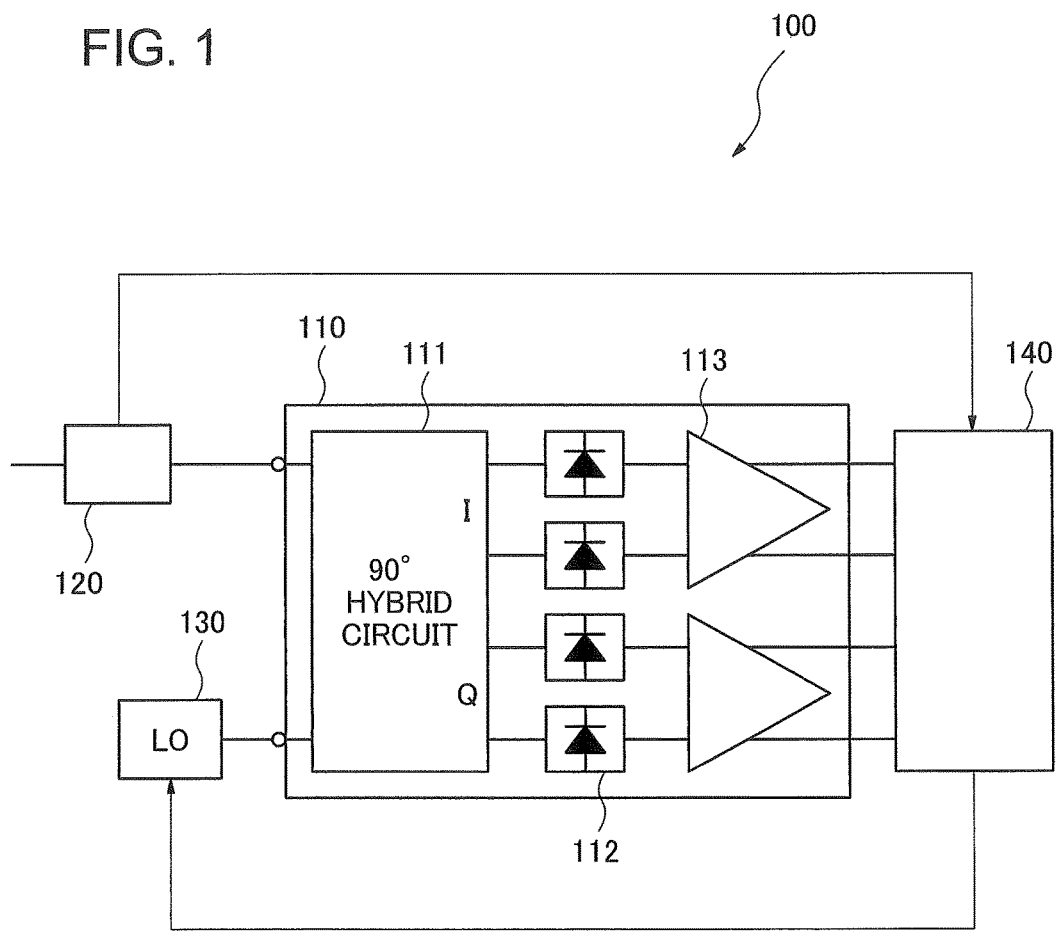
FIG. 1 is a block diagram showing a configuration of a coherent optical receiver device in accordance with the first exemplary embodiment of the present invention.

FIG. 1 is a block diagram showing a configuration of the coherent optical receiver device 100 in accordance with the first exemplary embodiment of the present invention. The coherent optical receiver device 100 includes a coherent optical receiver 110, an input power monitor 120, a local oscillator (LO) 130 connected to the coherent optical receiver 110, and a controller 140.

The coherent optical receiver 110 includes a 90-degree hybrid circuit 111, a photoelectric converter 112 composed of a photodiode and the like, and an amplifier 113. The coherent optical receiver 110 receives input signal light and detects it, and outputs a signal after detection to the controller 140.

The input power monitor 120 is disposed in the optical path of the input signal light in a stage preceding the amplifier 113, obtains input power information determined on the basis of the power of the input signal light, and outputs the input power information to the controller 140. Specifically, the input power monitor 120 can be configured to separate a minute amount of light from the input signal light and detect it by means of a photodetector, and the electrical output signal from the photodetector can be used as the input power information, for example.

The controller 140 obtains the input power information from the input power monitor 120 and controls the power of the local oscillation light output from the local oscillator (LO) 130 on the basis of the input power information.

If input signal light is multiplexed signal light in which signal light is multiplexed, the coherent optical receiver 110 receives the multiplexed signal light in a lump, selectively detects the signal light interfering with local oscillation light output by the local oscillator (LO) 130 out of the multiplexed signal light, and outputs the signal after detection. In this case, the related coherent optical receiver device has a problem that it is impossible to improve the decrease in the dynamic range, which becomes a problem particularly in receiving multiplexed signal light. This point will be described in detail below.

In the coherent optical transmission system, since the high-power local oscillation (LO) light is being input constantly unlike the IM-DD (Intensity Modulation-Direct Detection) system, the power dynamic range of the input signal light is limited. That is to say, if the output power of the local oscillation (LO) light is turned up in order to improve the minimum receiver sensitivity characteristics, the receivable maximum input power becomes smaller. Therefore, the relation of the improvement in the minimum receiver sensitivity and the extension of the transmission distance to the input dynamic range becomes trade-off. And in the related coherent optical receiver device, there is a problem that the dynamic range of the optical input power becomes smaller compared with the receiver of the IM-DD system due to the rating of the photodiode (PD) composing the optical receiver and the limitation of the amplification factor of the amplifier.

If the dynamic range becomes smaller, it becomes less able to absorb the influence caused by the loss fluctuation of an optical filter in an optical communication system such as an ROADM (Reconfigurable Optical Add/Drop Multiplexer) filter or by the wavelength loss fluctuation due to an EDFA (Erbium Doped Fiber Amplifier). For that reason, there is a problem that it becomes difficult to design the whole optical communication system and the related coherent optical receiver device cannot be applied to the current system.

On the other hand, the coherent optical transmission system has the feature that it can receive only a signal in the wavelength channel matched with the frequency of the local oscillation (LO) light. An optical FDM (Frequency Division Multiplexing) receiving system has been considered in which it is performed using such feature to input directly multiplexed signal light (multichannel) in the WDM (Wavelength Division Multiplexing) system into a coherent receiver without passing through an optical filter and to select the intended channel signal by the wavelength of the local oscillation (LO) light.

However, if the related coherent optical receiver is used in the optical communication system in which an optical filter such as an optical DMUX (De-multiplexer) filter is not used in the same way as the optical FDM receiving system, there is a problem that the dynamic range of the optical input power becomes even narrower. The reason is that the average input power of the coherent optical receiver device increases because the optical signals in a plurality of channels are input in a lump which include an optical signal in an unwanted channel which is not used as a channel signal.

As mentioned above, the coherent optical receiver device 100 in the present exemplary embodiment is configured to monitor the power of the input signal light received by the coherent optical receiver 110, and to control the power of the local oscillation light output by the local oscillator (LO) 130 on the basis of the monitoring results. By adopting such configuration, according to the coherent optical receiver device 100 in the present exemplary embodiment, it becomes possible to keep received signals in high quality in a simple configuration. And it is possible to secure a sufficient dynamic range even if the multiplexed signal light is selectively received by means of the wavelength of the local oscillation light. These points will be described in more detail.

Figure 2:
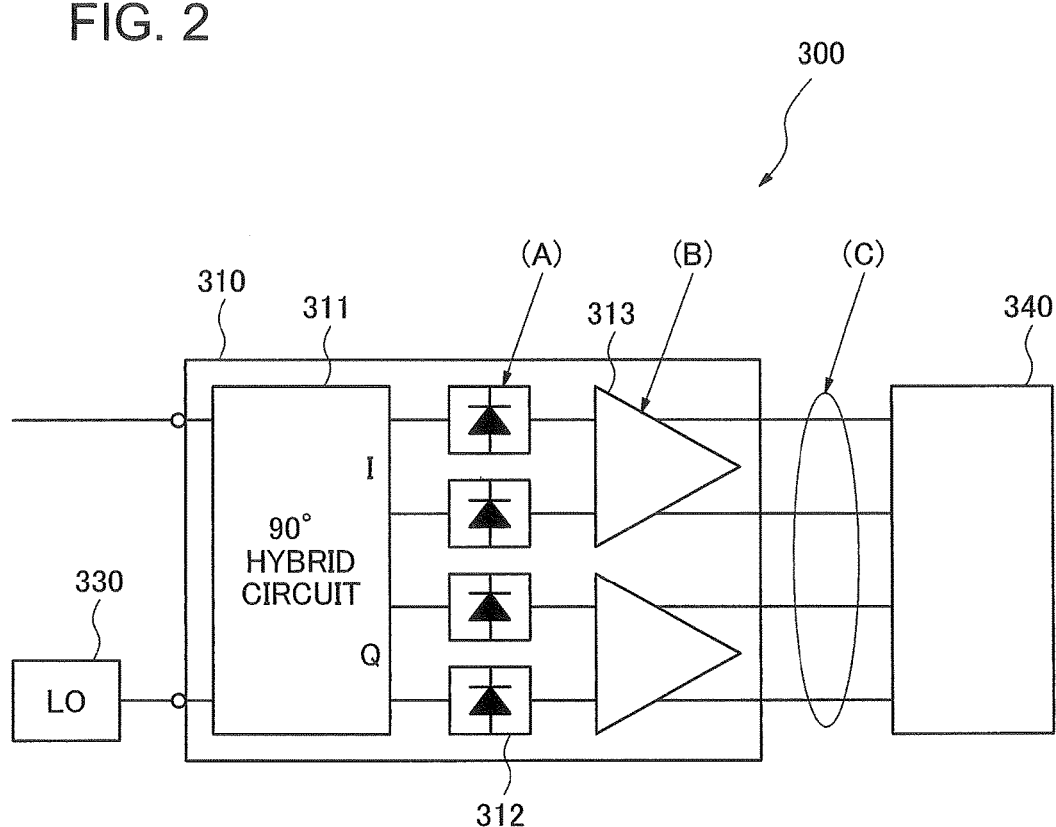
FIG. 2 is a block diagram showing a configuration of a related coherent optical receiver device to illustrate device limiting factors.

First, device limiting factors will be described which determine the signal quality of the received signal in the related coherent optical receiver device. FIG. 2 is a block diagram showing a configuration of the related coherent optical receiver device 300 to illustrate device limiting factors. The related coherent optical receiver device 300 includes a coherent optical receiver 310, a local oscillator (LO) 330 connected to the coherent optical receiver 310, and a controller 340. The coherent optical receiver 310 includes a 90-degree hybrid circuit 311, a photoelectric converter 312 composed of a photodiode and the like, and an amplifier 313 such as a differential amplifier.

As shown in the figure, the maximum input power of the actual optical signal in the related coherent optical receiver device 300 is determined by the maximum input power limitation of the photoelectric converters 312 (A), an amplification factor of the amplifier 313 (B), and a limiting condition of the signal output amplitude (C). Only the maximum amplification factor of the amplifier 313 (B) becomes a problem if the input optical power is small. However, if the input power is large, the maximum input power limitation (maximum input rating) of the photoelectric converters 312 (A), the minimum amplification factor of the amplifier 313 (B), and the maximum value of the signal output amplitude (C) become problems.

Figure 3:
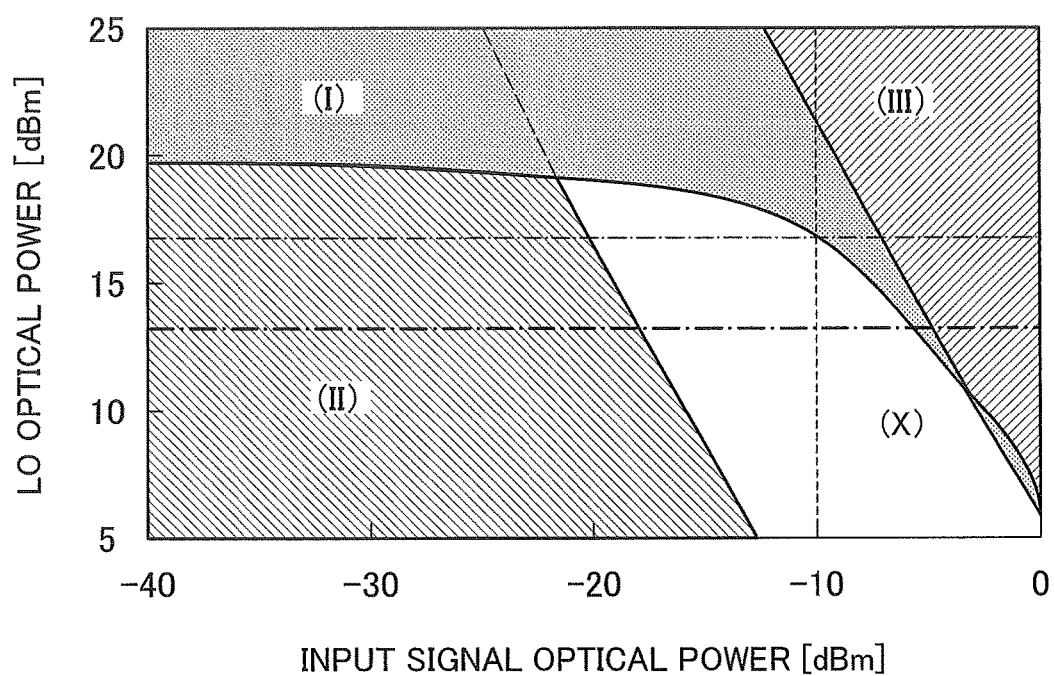
FIG. 3 is a diagram showing the relationship between the input signal optical power and the local oscillation optical power in the related coherent optical receiver device in receiving multiplexed signal light.

As a concrete example, the input limitation of the related coherent optical receiver device in the case of receiving multiplexed signal light (multichannel) will be described. FIG. 3 is a diagram showing the relationship between the input signal optical power and the local oscillation optical power in the related coherent optical receiver device in receiving multiplexed signal light. The horizontal axis represents the input signal optical power and the vertical axis represents the local oscillation (LO) optical power.

In FIG. 3, the area (I) represents the limitation due to the maximum rating of the photoelectric converter, the area (II) represents the limitation due to the upper gain limit of the amplifier, and the area (III) represents the limitation due to the lower gain limit of the amplifier. It is found from the diagram that an area practically usable in the optical communication system in which received signals with high quality can be obtained is limited to the area without the hatching (X) in the diagram.

Here, according to the coherent optical receiver device of the present exemplary embodiment, the input power monitor monitors the input signal optical power and outputs the input power information to the controller. From the above-described limiting factors and the input power information, the controller calculates the local oscillation optical power by which received signals with high quality can be obtained, and controls the local oscillator (LO) so as to output the local oscillation light with the calculated power.

That is to say, if the input signal optical power is within the range of the limitation due to the maximum rating of the photoelectric converter (area (I)) or the limitation due to the lower gain limit of the amplifier (area (III)), the controller controls the local oscillator to decrease its power. On the other hand, the input signal optical power sometimes decreases owing to an unexpected occurrence in the optical communication system, for example. In this case, the input signal optical power is subject to the limitation due to the upper gain limit of the amplifier included in the coherent optical receiver (area (II)). At this time, the controller controls the local oscillator to increase its power, and therefore it becomes possible to receive signals in high quality.

If the multiplexed signal light is selectively received by means of the wavelength of the local oscillation light, the optical signals in a plurality of channels are input in a lump. Accordingly, because of the limitation due to the maximum input power of the photoelectric converter (area (I)), the range of input signal optical power in which signals can be obtained in high quality (dynamic range of the optical input) becomes narrower. Even in that case, according to the coherent optical receiver device in the present exemplary embodiment, it is possible to relax the limitation due to the maximum input power of the photoelectric converter by decreasing the local oscillation optical power output from the local oscillator. Accordingly, it is possible to secure a sufficient dynamic range.

Describing the example shown in FIG. 3, for example, if the local oscillation optical power is set equal to 20 dBm with the input signal optical power equal to −10 dBm, it is impossible to obtain received signals in high quality owing to the limitation due to the maximum rating of the photoelectric converter (area (I)). At this time, by reducing the local oscillation optical power to about 16 dBm or smaller, it becomes possible to operate in the area in which received signals with high quality can be obtained (area (X)). In addition, by setting the local oscillation optical power equal to about 13 dBm, it is possible to broaden the dynamic range of the optical input to 10 dBm or larger.

Figure 4:
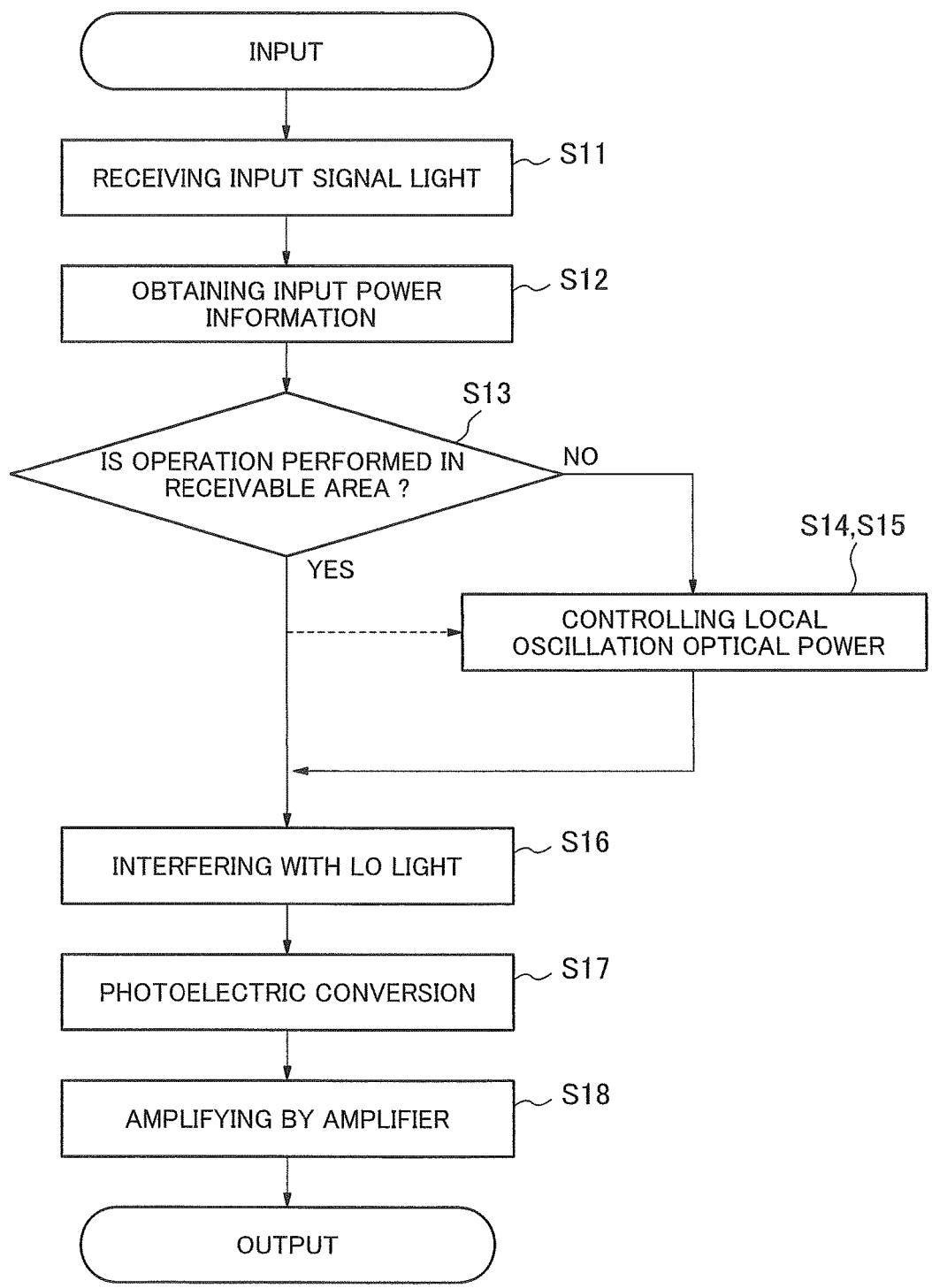
FIG. 4 is a flowchart illustrating an operation of a coherent optical receiver device in accordance with the first exemplary embodiment of the present invention.

Next, the operation of the coherent optical receiver device 100 in the present exemplary embodiment will be described using FIG. 4. FIG. 4 is a flowchart illustrating the operation of the coherent optical receiver device 100 in the present exemplary embodiment. First, the coherent optical receiver device 100 receives input signal light in the coherent optical receiver 110 (step S11). At that time, the input power monitor 120 obtains input power information determined on the basis of the power of the input signal light (step S12) and outputs the input power information to the controller 140.

On the basis of the local oscillation optical power and the input signal optical power which is obtained from the input power information received from the input power monitor 120, the controller 140 determines whether or not the operation is performed in the area where received signals with high quality can be obtained (a receivable area, that is, area X in FIG. 3) (step S13). If the operation is not performed in the receivable area (step S13/NO), the controller 140 performs a control to increase or decrease the power of the local oscillation light which is output by the local oscillator (LO) 130 (step S14). In contrast, if the operation is performed in the receivable area (step S13/YES), the controller 140 does not change the power of the local oscillation light. However, if multiplexed signal light in which signal light is multiplexed is input as an input signal, a control to decrease the power of the local oscillation light (step S15) can be performed even if the operation is performed in the receivable area (a dotted line from the step S13/YES to the step S15). This enables the dynamic range of the optical input to be enlarged.

Next, the 90-degree hybrid circuit 111 makes the input signal light interfere with the local oscillation light output by the local oscillator (LO) 130 (step S16), and then a photoelectric conversion process is performed by means of the photoelectric converter 112 (step S17). At that time, if the multiplexed signal light is input as the input signal light, the signal light interfering with the local oscillation light output by the local oscillator (LO) 130 is selectively detected out of the multiplexed signal light. The amplifier 113 amplifies the electrical signals produced by the photoelectric conversion and outputs them to the controller 140 (step S18).

As mentioned above, according to the coherent optical receiving method in the present exemplary embodiment, it is determined on the basis of the input power information whether or not the operation is performed in the receivable area. And then, if the operation is not performed in the receivable area, the control is performed to increase or decrease the power of the local oscillation light. Accordingly, it becomes possible to keep received signals in high quality in a simple configuration. In addition, if the multiplexed signal light is selectively received by means of the wavelength of the local oscillation light, it is possible to perform the control to decrease the power of the local oscillation light even if the operation is performed in the receivable area. Accordingly, it is possible to secure a sufficient dynamic range.

Although the case has been illustrated in FIG. 1 in which the input power monitor 120 is disposed in the optical path of the input signal light in a stage preceding the coherent optical receiver 110, it is not limited to this, it is also acceptable to dispose it in other locations as long as in the optical path of the input signal light in a stage preceding the amplifier 113. For example, it is acceptable to dispose the input power monitor 120 inside the coherent optical receiver 110. In addition, if the photoelectric converter 112 has a monitoring function, it is also acceptable to use the monitoring function as the input power monitor 120.

The photoelectric converter 112 and the amplifier 113, which compose the coherent optical receiver 110, can adopt the differential type configuration.

The Second Exemplary Embodiment

Next, the second exemplary embodiment of the present invention will be described. In the present exemplary embodiment, a case will be described as an example in which the Dual Polarization Quadrature Phase Shift Keying (DP-QPSK) system is employed as a modulation method. In addition, a case will be described in which the multiplexed signal light is input as the input signal light.

Figure 5:
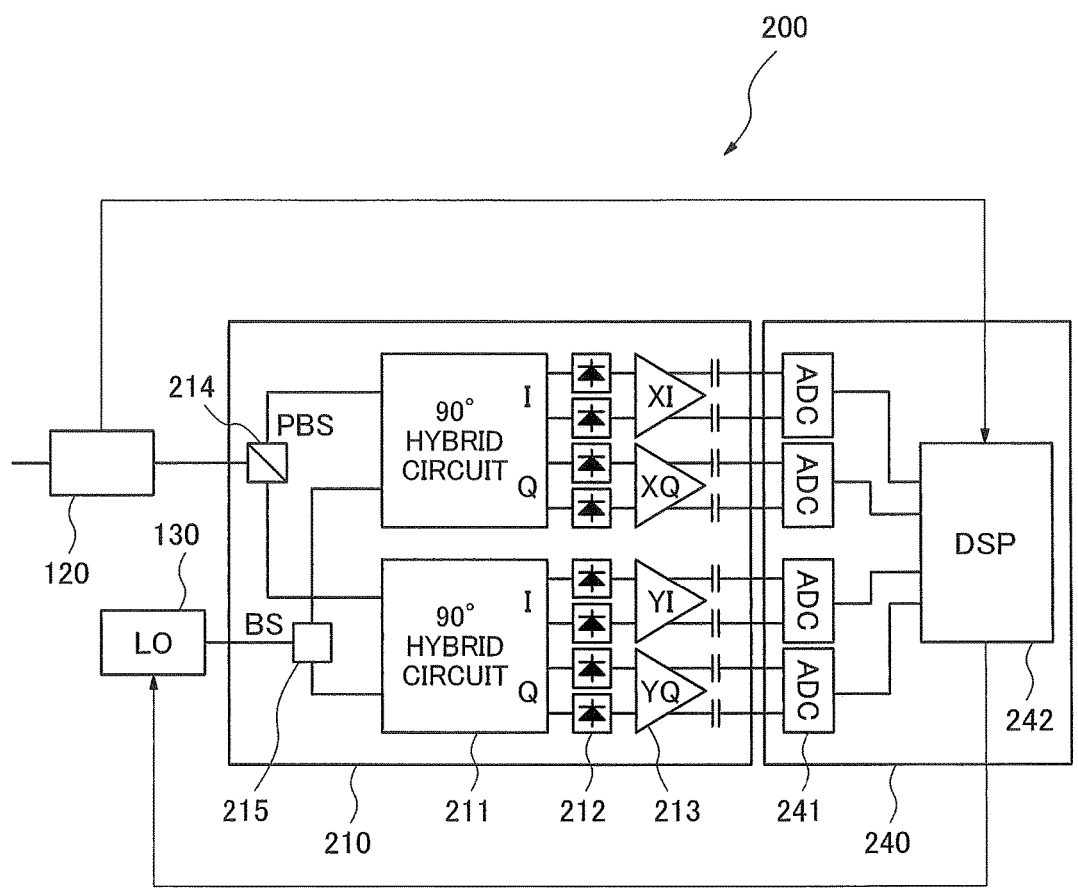
FIG. 5 is a block diagram showing a configuration of a coherent optical receiver device in accordance with the second exemplary embodiment of the present invention.

FIG. 5 is a block diagram showing a configuration of a coherent optical receiver device 200 in accordance with the second exemplary embodiment of the present invention. The coherent optical receiver device 200 includes a coherent optical receiver 210, an input power monitor 120, a local oscillator (LO) 130 connected to the coherent optical receiver 210, and a controller 240.

The coherent optical receiver 210 includes 90-degree hybrid circuits 211, a photoelectric converter 212, and an amplifier 213. The coherent optical receiver 210 receives the multiplexed signal light in a lump in which signal light is multiplexed, selectively detects the signal light interfering with the local oscillation light output by the local oscillator (LO) 130 out of the multiplexed signal light, and outputs the signal after detection. The input power monitor 120 is disposed in the optical path of the input signal light in a stage preceding the amplifier 213, and obtains input power information determined on the basis of the power of the input signal light, and outputs the input power information to the controller 240. The configuration above is similar to that of the coherent optical receiver device 100 according to the first exemplary embodiment.

In the coherent optical receiver device 200 according to the present exemplary embodiment, the controller 240 includes an analog-to-digital converter (ADC) 241 and a digital signal processor (DSP) 242. It is configured that the digital signal processor (DSP) 242 obtains the input power information from the input power monitor 120 and controls the power of the local oscillation light output by the local oscillator (LO) 130 on the basis of the input power information.

The configuration of the coherent optical receiver device 200 will be described below more specifically. The multiplexed signal light modulated in phase is input in a lump into the coherent optical receiver 210 from its signal light input port. On the other hand, the local oscillation light is input from the local oscillator (LO) 130 at its local oscillation (LO) light port. In addition, the coherent optical receiver 210 includes a polarization beam splitter (PBS) 214 in an input side of the signal light and a beam splitter (BS) 215 in an input side of the local oscillation light.

By the polarization beam splitter (PBS) 214 composing the coherent optical receiver 210, the input multiplexed signal light is separated into two polarized light beams, which are input into the 90-degree hybrid circuits (90° Hybrid) 211 respectively. The multiplexed signal light is separated into an in-phase component (I) and a quadrature-phase component (Q) in the 90-degree hybrid circuit 211, each of which is fed by the differential input into a photodiode (PD) as the photoelectric converter 212. In more detail, the beat output composed of the multiplexed signal light and the local oscillation (LO) light is branched by diversity branch with respect to each of the polarization, the phase, and the intensity, then each of eight kinds of optical signals in total is input into the photodiode (PD).

Only the AC signal component in the output signal from the photodiode (PD) is extracted by a differential amplifier as the amplifier 213, and is amplified to the output amplitude suitable for the analog-to-digital converter (ADC) 241 in the following stage. After that, those signals are converted by each of four analog-to-digital converters (ADC) 241 into digital signals, and are processed as signals mapped onto two I/Q planes in the digital signal processor (DSP) 242.

The digital signal processor (DSP) 242 performs a decoding process using the digital signals from the analog-to-digital converter (ADC) 241. At the same time, it finds out an operating condition of the coherent optical receiver 210 from the local oscillation optical power and the input power information obtained from the input power monitor 120. Here, it is possible to use the electrical output signal of a photodetector for branched input signal light as the input power information, and the input signal optical power is obtained from the input power information. And then, the digital signal processor (DSP) 242 determines whether or not the operation of the coherent optical receiver 210 is performed in the area where received signals with high quality can be obtained (receivable area). That is to say, it determines whether or not the operating condition of the coherent optical receiver 210 is an operation performed in the receivable area which is determined by the maximum rating of the photoelectric converter 212, the upper gain limit of the amplifier 213, and the lower gain limit of the amplifier 213.

If the digital signal processor (DSP) 242 determines that the operating condition is not an operation performed in the receivable area, the digital signal processor (DSP) 242 increases or decreases the power of the local oscillation light output by the local oscillator (LO) 130. By doing this, it controls the coherent optical receiver 210 so as to operate in the receivable area. In addition, with the operation being performed in the receivable area, it is possible to relax the limitation due to the maximum input power of the photoelectric converter by controlling the local oscillator (LO) 130 so that the power of the local oscillation light may decrease. As a result, it is possible to enlarge the dynamic range of the optical input in the coherent optical receiver device 200.

Although the case has been illustrated in FIG. 5 where the input power monitor 120 is disposed in the optical path of the input signal light in a stage preceding the coherent optical receiver 210, it is not limited to this, it is also acceptable to dispose it in other locations as long as in the optical path of the input signal light in a stage preceding the amplifier 213.

As described above, the coherent optical receiver device 200 according to the present exemplary embodiment is configured to monitor the power of the input signal light received by the coherent optical receiver 210 and to control the power of the local oscillation light output by the local oscillator (LO) 130 on the basis of the monitoring results. By adopting this configuration, it becomes possible to control the coherent optical receiver 210 so as to operate in the receivable area and to relax the limitation due to the maximum input power of the photoelectric converter in receiving the multiplexed signal light. As a result, according to the coherent optical receiver device 200 of the present exemplary embodiment, it becomes possible to keep received signals in high quality in a simple configuration. In addition, even if the multiplexed signal light is selectively received by means of the wavelength of the local oscillation light, it is possible to secure a sufficient dynamic range.

The present invention is not limited to the above-mentioned exemplary embodiments and can be variously modified within the scope of the invention described in the claims. It goes without saying that these modifications are also included in the scope of the present invention.

The present application is based upon and claims the benefit of priority from Japanese Patent Application No. 2011-009701, filed on Jan. 20, 2011, the disclosure of which is incorporated herein in its entirety by reference.

DESCRIPTION OF THE CODES

100, 200 coherent optical receiver device
110, 210 coherent optical receiver
111, 211 90-degree hybrid circuit
112, 212 photoelectric converter
113, 213 amplifier
120 input power monitor
130 local oscillator (LO)
140, 240 controller
241 analog-to-digital converter (ADC)
242 digital signal processor (DSP)
300 related coherent optical receiver device
310 coherent optical receiver
311 90-degree hybrid circuit
312 photoelectric converter
313 amplifier
330 local oscillator (LO)
340 controller

What is claimed is:

1. A coherent optical receiver device, comprising:
a local oscillator configured to output a local oscillation light;
a coherent receiver configured to receive an input optical signal by an interference with the local oscillation light;
an electrical processing device configured to process electrically the optical signal received by the coherent receiver; and
an optical power monitor configured to monitor power of the input optical signal before the coherent receiver,
wherein the local oscillator outputs the local oscillation light including optical power based on the monitored power of the input optical signal.

2. The coherent optical receiver device according to claim 1,
wherein the input optical signal includes a wavelength multiplexed optical signal in which a plurality of wavelengths are multiplexed, and
wherein the coherent receiver selectively receives an optical signal among the wavelength multiplexed optical signal by the interference with the local oscillation light.

3. The coherent optical receiver device according to claim 1, further comprising:
a polarization beam splitter; and
a local oscillation light splitter,
wherein the input optical signal includes a polarization multiplexed optical signal in which various polarized lights are multiplexed,
wherein the polarization beam splitter splits the polarization multiplexed optical signal into a first polarization optical signal and a second polarization optical signal,
wherein the local oscillation light splitter splits the local oscillation light into a first split light and a second split light, and
wherein the coherent receiver receives the first polarization optical signal by an interference with the first split light, and receives the second polarization optical signal by an interference with the second split light.

4. The coherent optical receiver device according to claim 1, wherein the local oscillator outputs the local oscillation light including the optical power based on the monitored power of the input optical signal and optical power of the local oscillation light.

5. The coherent optical receiver device according to claim 1, wherein the local oscillator outputs the local oscillation light including the optical power based on the monitored power of the input optical signal and a predetermined maximum power.

6. The coherent optical receiver device according to claim 1, further comprising an electrical signal amplifier configured to electrically amplify the received input optical signal,
wherein the local oscillator outputs the local oscillation light including the optical power based on the monitored power of the input optical signal and a gain limit of the electrical signal amplifier.

7. The coherent optical receiver device according to claim 6, wherein the local oscillator outputs the local oscillation light including the optical power based on the monitored power of the input optical signal and a predetermined maximum power of the gain limit of the electrical signal amplifier.

8. A coherent optical receiving method, comprising:
outputting a local oscillation light;
receiving an input optical signal an interference with the local oscillation light;
processing electrically the optical signal received by the interference with the local oscillation light;
monitoring power of the input optical signal before a coherent receiver; and
outputting the local oscillation light including an optical power based on the monitored power of the input optical signal.

9. The coherent optical receiving method according to claim 8, further comprising selectively receiving an optical signal from the input optical signal by interference with the local oscillation light,
wherein the input optical signal includes a wavelength multiplexed optical signal in which a plurality of wavelengths are multiplexed.

10. The coherent optical receiving method according to claim 8, further comprising:
splitting the input signal into a first polarization optical signal and a second polarization optical signal, wherein the input optical signal includes a polarization multiplexed optical signal in which various polarized lights are multiplexed;
splitting the local oscillation light into a first split light and a second split light;

receiving the first polarization optical signal by an interference with the first split light; and receiving the second polarization optical signal by an interference with the second split light.

11. The coherent optical receiving method according to claim 8, further comprising outputting the local oscillation light including optical power based on the monitored power of the input optical signal and optical power of the local oscillation light.

12. The coherent optical receiving method according to claim 8, further comprising outputting the local oscillation light including optical power based on the monitored power of the input optical signal and a predetermined maximum power.

13. The coherent optical receiving method according to claim 8, further comprising:

electrically amplifying the received input optical signal; and outputting the local oscillation light including optical power based on the monitored power of the input optical signal and a gain limit of the electrical amplification of the received input optical signal.

14. The coherent optical receiving method according to claim 13, further comprising outputting the local oscillation light including optical power based on the monitored power of the input optical signal and a predetermined maximum power and the gain limit of the electrical amplification of the received input optical signal.

* * * * *